United States Patent [19]
Phaal

[11] Patent Number: 5,557,547
[45] Date of Patent: Sep. 17, 1996

[54] MONITORING SYSTEM STATUS

[75] Inventor: Peter Phaal, Bradley Stoke, United Kingdom

[73] Assignee: Hewlett-Packard Company, Palo Alto, Calif.

[21] Appl. No.: 481,196

[22] Filed: Jun. 7, 1995

Related U.S. Application Data

[63] Continuation of Ser. No. 135,924, Oct. 13, 1993, abandoned.

[30] Foreign Application Priority Data

Oct. 22, 1992 [GB] United Kingdom ............... 9222282
Apr. 8, 1993 [GB] United Kingdom ............... 9307494

[51] Int. Cl.$^6$ ........................................... G01R 13/00
[52] U.S. Cl. ................ 364/551.01; 395/103; 364/514 B
[58] Field of Search ........................ 364/550, 551.01, 364/514 R, 514 B; 395/103, 140, 143

[56] References Cited

U.S. PATENT DOCUMENTS

| | | | |
|---|---|---|---|
| 4,527,240 | 7/1985 | Kvitash | 364/415 |
| 4,730,302 | 3/1988 | Fuerliuger et al. | 370/17 |
| 5,231,593 | 7/1993 | Notess | 370/17 |
| 5,271,000 | 12/1993 | Eugbersen et al. | 370/17 |
| 5,317,563 | 5/1994 | Oouchi et al. | 370/17 |

FOREIGN PATENT DOCUMENTS

| | | |
|---|---|---|
| WO89/01266 | 2/1989 | European Pat. Off. |
| 0477448A1 | 4/1992 | European Pat. Off. |
| 0495289A2 | 7/1992 | European Pat. Off. |
| 0477448 | 4/1992 | United Kingdom. |

OTHER PUBLICATIONS

Elektronik, vol. 41, No. 5, Mar. 1992, Munchen De pp. 81–87.
Elektronik, vol. 41, No. 18, Aug. 1992, Munchen De pp. 48–50.
Data Communications, vol. @!, No. 6, Apr. 1992, pp. 43–44.
European Search Report dated 20 Dec. 1994.
"Technology Improves process control displays", Sam Herb, Product Line Manager, Distributed Systems, Leeds & Northup Co., North Wales, PA The Industrial and Process Control Magazine, May 1984 pp. 45–49.

*Primary Examiner*—Ellis B. Ramirez
*Assistant Examiner*—Thomas Peeso

[57] ABSTRACT

In order to monitor the status of a system in the form of a communications network, such as a computer local area network (LAN) 10 or an SS7 telecommunications signalling network, measurements are made of various operating parameters for each domain (S1 ... S14) or segment of the network. The measurements for each parameter are scaled in accordance with a respective piecewise-linear scaling function (300) for that parameter, so that all scaled measurements for all parameters have values in a range from 0 to 3, values of 1 and 2 corresponding to threshold values $T_1$ and $T_2$ of interest. An extreme scaled value, such as the maximum or minimum value, is selected for each parameter, and plotted on a respective one of multiple radially-extending axes (301–306), each of which is associated with a respective parameter. The plotted values are connected to form a polygonal figure (309).

20 Claims, 8 Drawing Sheets

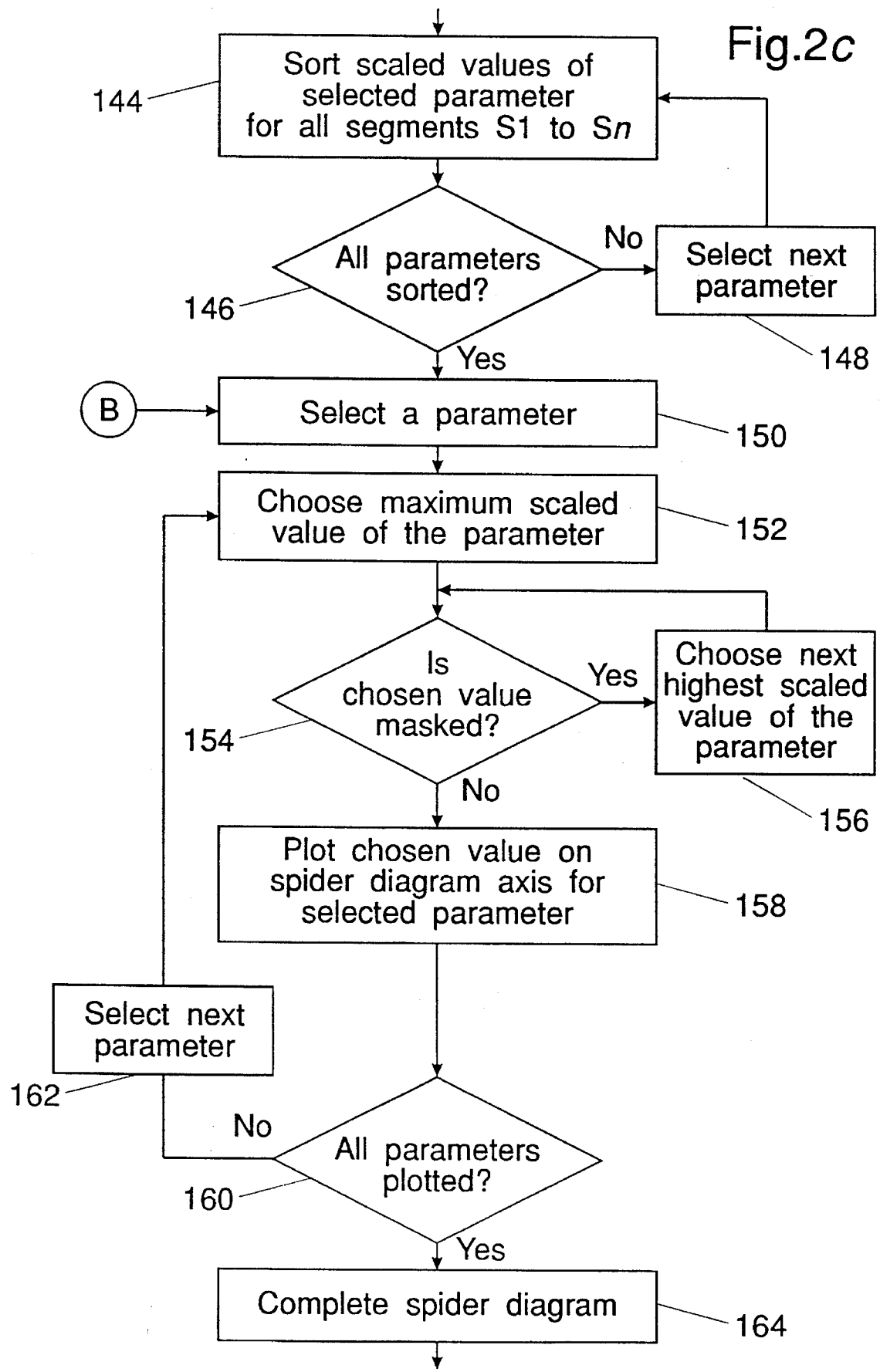

MONITORING SYSTEM STATUS

This is a continuation of application Ser. No. 08/135,924, filed on Oct. 13, 1993, now abandoned.

TECHNICAL FIELD

This invention relates to methods and apparatus for monitoring system status, and particularly, though not exclusively, for monitoring the status of multiple operating parameters of a multiple domain data communication network.

BACKGROUND ART

The widespread use of computers has led to the creation of networks of various kinds to facilitate the exchange of data between computers and the cost-effective use of sharable resources such as printers and file servers.

One common kind of network is the so-called Local Area Network (LAN), typically used for connecting personal computers and computer workstations to each other and to sharable resources. A LAN often has multiple 'segments', each segment being a section of network which is separated from all other sections by one or more devices (such as bridges or routers) for filtering messages traversing the network. LANs have grown to the extent that some are very complex, comprising tens or hundreds of segments with hundreds or thousands of devices coupled to them.

A segment in the context of a LAN is an example of a notional subdivision of a network the equivalent of which in the context of other kinds of network may be referred to as a 'domain'. National and international telecommunications transmission networks for carrying voice and data signals are increasingly being designed around the use of computers. In particular, a second, computerized, signalling network is frequently provided in parallel with, and for controlling switching and other operation of, the transmission network carrying voice and data traffic. This signalling network may operate in accordance with, for example, an agreed standard commonly known as Signalling System No. 7 (SS7). An entire SS7 network may have many thousands of signalling points interconnected by a large number of signalling links. Such a network is typically treated as comprising several sub-divisions known as domains. A domain may be any subset of the overall network which it is convenient to identify as a distinct entity for commercial or operational reasons.

The term domain is used herein to refer to any convenient sub-division of a network, such as a segment in a LAN or a domain in an SS7 network.

Large networks present formidable problems of management and maintenance. A fault in one device on the network can cause undesirable effects over extensive portions of the network, without the identity of the source of the problems being immediately evident.

With a view to assisting fault-finding and repair, various measurements are typically made of a variety of operating parameters of each domain of a network, such as (in the case of a LAN) cyclic-redundancy check (CRC) errors, data frame or packet communication rates and utilization. However, on a large network the sheer quantity of such measurements is a significant hindrance to their effective use in fault-location. There may be several hundred such measurements in total, of which just one may be the key to the true cause of a problem. None of the other measurements will necessarily provide any indication of the identity of that key measurement. Thus successful identification of the key measurement is entirely haphazard, relying on chance or an exhaustive and time-consuming review of every available measurement. Furthermore, there has previously been no effective way of presenting a summary of such measurements which can alert a network manager to a condition which may be indicative of a fault and which warrants investigation.

It is an object of this invention to provide a method and apparatus for monitoring the status of systems in which many measurements are made of multiple parameters (and of which a multiple domain data communication network is one example), which at least alleviate these problems.

A technique has been proposed in U.S. Pat. No. 4,527,240, for the unrelated field of blood chemistry evaluation, in which the values of various measured parameters of only one blood sample are plotted on respective radial axes on a circular coordinate arrangement. However, this proposal relates to a completely different technical field from the present invention, and moreover does not even address the problem of identification of a key measurement among a very large population of measurements obtained from a multiplicity of sources.

DISCLOSURE OF INVENTION

According to one aspect of this invention there is provided a method of monitoring multiple measurements of each of multiple parameters related to the operational status of a system, comprising the steps of:

acquiring multiple measurements of each of said parameters;

for each parameter, applying a scaling function to each measurement of that parameter to derive a scaled value thereof as a function of predetermined threshold values for that parameter, said scaled values being within a predetermined range common to all said parameters;

for each parameter, selecting an extreme one of said scaled values; and plotting said selected scaled value on a respective one of a multiplicity of axes, each said axis corresponding to a respective said parameter.

According to another aspect of this invention there is provided apparatus for monitoring multiple measurements of each of multiple parameters related to the operational status of a system, comprising:

means for receiving multiple measurements of each of said parameters;

means for applying, for each parameter, a scaling function to each measurement of that parameter to derive a scaled value thereof as a function of predetermined threshold values for that parameter, said scaled values being within a predetermined range common to all said parameters;

means for selecting, for each parameter, an extreme one of said scaled values; and means for plotting said selected scaled value on a respective one of a multiplicity of axes, each said axis corresponding to a respective said parameter.

BRIEF DESCRIPTION OF DRAWINGS

A method and apparatus for monitoring system status in accordance with this invention will now described, by way of example, with reference to the accompanying drawings, in which:

FIGS. 2a to 2d comprise a flow chart showing steps involved in the method;

BEST MODE FOR CARRYING OUT THE INVENTION, & INDUSTRIAL APPLICABILITY

Figure 1:
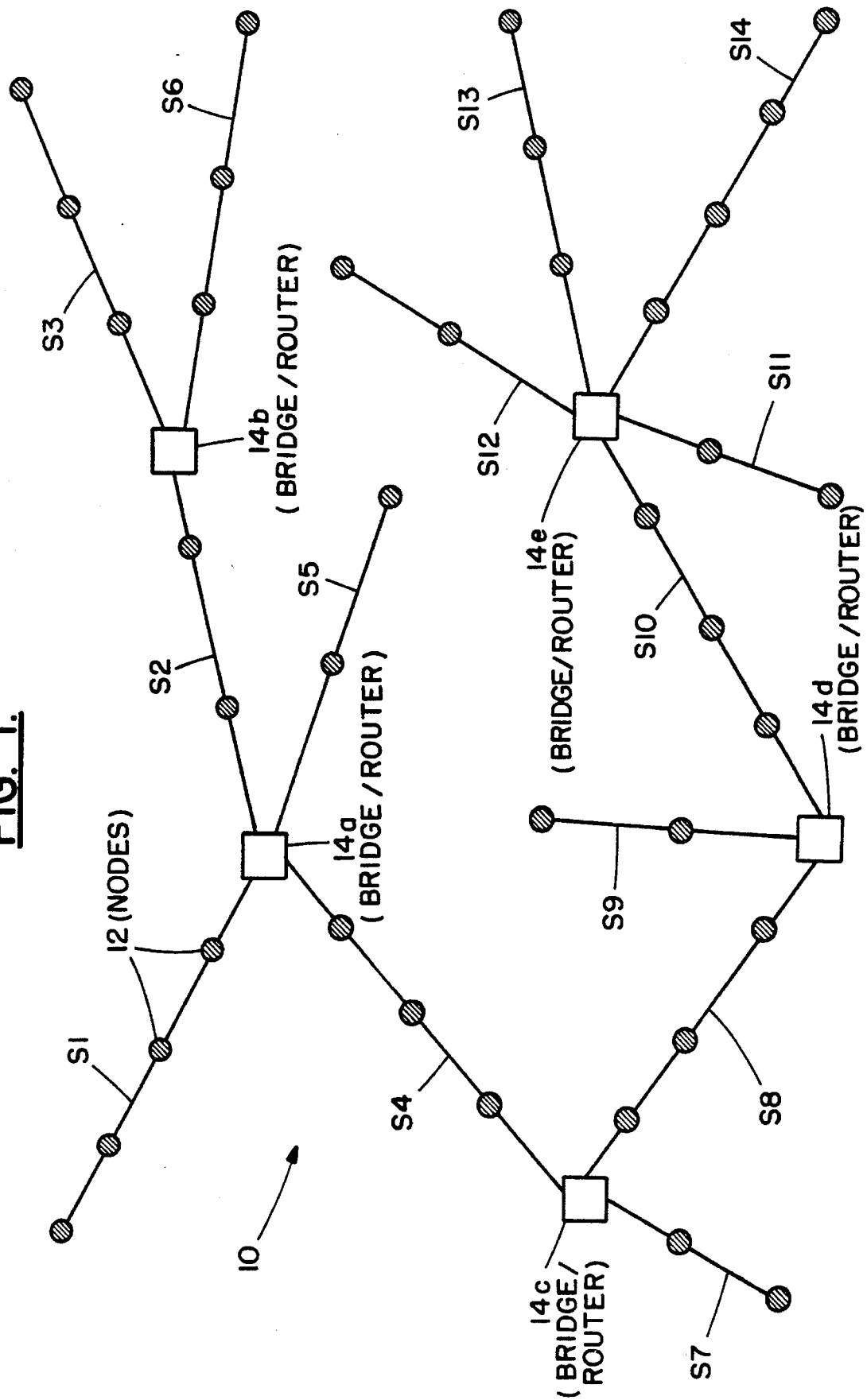
FIG. 1 is a schematic view of a system comprising a LAN having multiple domains or segments.

Referring to FIG. 1, a data communication network 10 comprises a LAN having multiple domains in the form of segments S (in this example fourteen segments S1 to S14). Each segment has a plurality of nodes 12 connected to it; a node may be, for example, a personal computer, a workstation, a multi-user computer (such as a minicomputer or a mainframe computer), a printer or a file server (disc store). A LAN segment is considered to be a section of the network 10 in which every node connected to that section receives every message transmitted by any other node connected to that section. Such segments are connected together by bridges and routers 14a to 14e which transfer messages selectively between segments in accordance with their intended destinations; bridges generally involve services of only the physical and data link layers of the seven-layer OSI model of network operation, whereas routers also invoke services in the network layer to provide choices on precise routes that messages take through the network. The network 10 may be implemented using any of a variety of known network technologies, such as the IEEE 802.3 standard (also known as Ethernet) or token ring.

A system such as a data communication network involves relatively expensive installation of cabling or optical fibre and of associated equipment, and typically becomes a fundamental part of the service infrastructure of an organization using the network. Accordingly, it is essential for the network to be managed and maintained in a manner which is both cost-effective and ensures a high degree of reliability and availability. To this end, it is usual to incorporate into a network facilities for monitoring and managing its operation and the use of its resources.

In particular, a variety of operating parameters are measured on a repetitive basis and made available to network managers for scrutiny. These parameters typically include:

the extent of utilization of the available network capacity;

the rate of transfer of data frames;

the rate of occurrence of CRC errors;

the rate of occurrence of alignment errors (i.e. frames with incomplete bytes);

the rate of generation of multicast messages;

the rate of generation of broadcast messages.

Some of these parameters may be measured directly, while others may be calculated from more fundamental values such as counts of transmitted frames, byte counts and CRC error counts. Such measurements can be used to detect the presence of faults in the network 10, and to identify where in the network a fault is located. For this purpose the measurements are normally made for each network segment individually.

Although these measurements are potentially very useful, their utility can be seriously diminished by their sheer volume in the case of large networks. Some networks have several hundreds or thousands of segments. Measurement of six or more parameters for each segment results in a total of many hundred measured values, only one or two of which may be of direct use in tracking down a particular fault. However, it is very difficult or impossible for a human user to review such a large quantity of data and select the relevant values—the task is analogous to locating the proverbial 'needle in a haystack'. The procedure set out in FIGS. 2a to 2d provides a machine-implemented approach for analysing this mass of data about the system prior to inspection by the user, in order to alleviate this problem.

This procedure may be implemented with equipment comprising either purpose-designed hardware or an appropriately-programmed general-purpose computer, as convenient. Certain steps in the procedure involve interaction with a user of the equipment; for this purpose the equipment will typically include a display device such as a visual display unit and an input device such as a keyboard and/or a pointing device (sometimes known as a mouse). The general principles of such devices and the manner in which they may be used to enable interaction when required between the equipment and its user are well known to those skilled in the relevant art and will therefore not be described here.

Figure 2A:
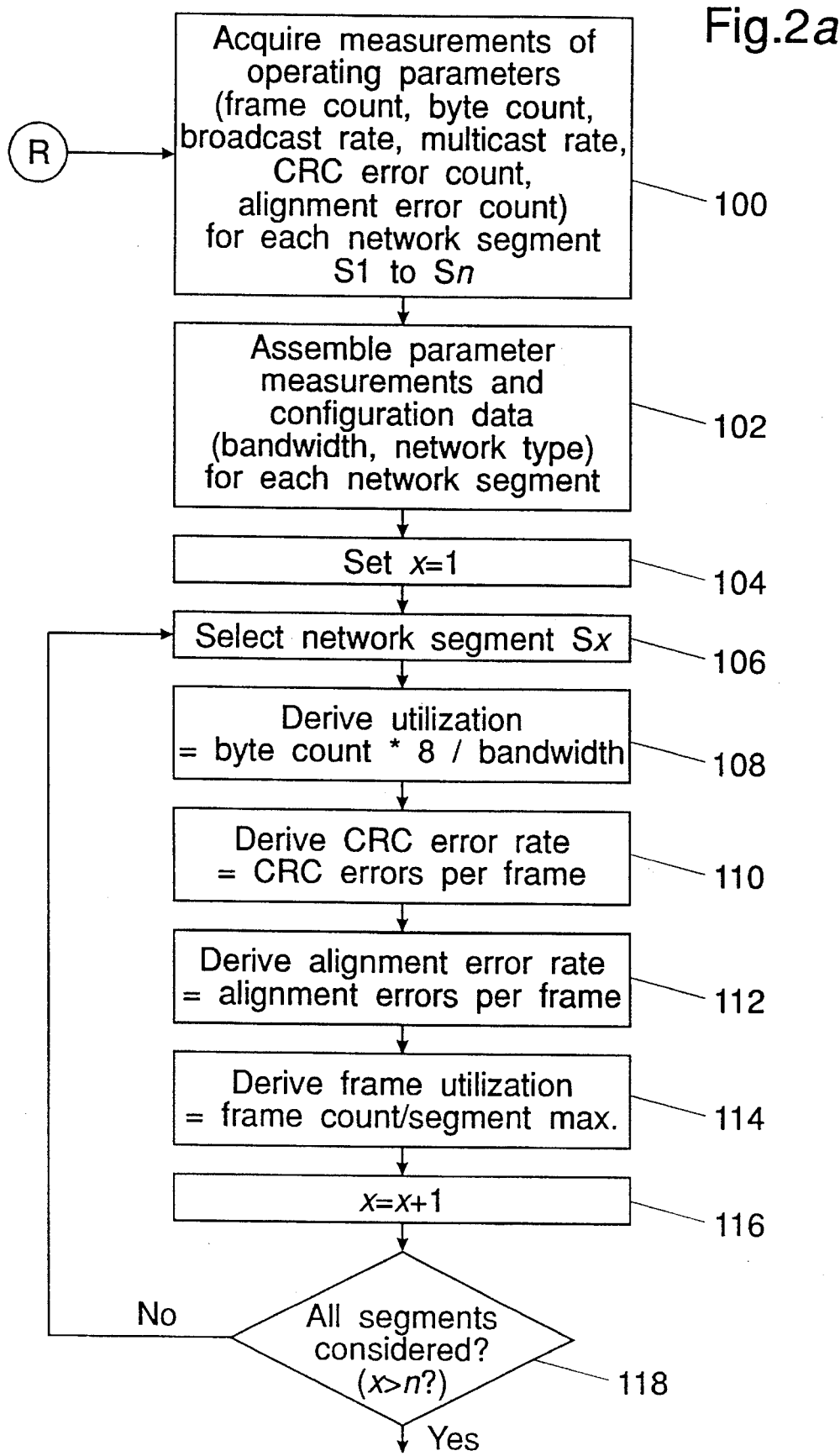

Referring to FIG. 2a, the first step 100 of the procedure consists of acquiring measurements of operating parameters and values of interest, such as:

count of data frames transmitted;

count of data bytes transmitted;

count of CRC errors;

count of alignment errors;

the rate of generation of multicast messages;

the rate of generation of broadcast messages.

To allow temporal changes in network operation to be followed, these measurements may relate to the number of events occurring in a unit time interval; thus, for example, the number of frames transmitted in each successive minute may be divided by sixty, to provide a count of frames per second averaged over a one minute interval. The measurements are acquired for each of the segments S1 to Sn (where n is the total number of segments in the network, and in the example of FIG. 1 has a value of 14). Any convenient method known to those skilled in the art may be used for this purpose; thus, for example, the technique based on random sampling of message frames or packets as described in European patent application No. 0 477 448 may be used. However, the particular methods used for acquiring measurements of each of the desired parameters and values form no part of the present invention, and accordingly will not be described in detail herein.

At step 102, these measured data are assembled together, along with data relating to the configuration of the network 10. The configuration data include such information as the overall data transfer bandwidth of each segment S and the type of technology (such as Ethernet or token ring) on which each segment is based. In the case of a program implementation, the data may be conveniently organized into a tabular data structure with each row relating to a respective one of the segments S1 to Sn, and each column relating to a respective one of the measured and configuration data.

In the following step 104 a counter x is initialized to a value of unity, and is then used at step 106 to identify the segment, in the first instance S1, to be considered in the following group of steps 108 to 114; equivalently the counter x indicates the relevant row of a tabular data structure assembled as described at step 102.

At step 108 the overall utilization for the segment under consideration is calculated from the measured byte count during the unit time interval and the bandwidth (in bits per second) of that segment, in accordance with the relationship:

$$\text{utilization} = \text{byte count} * 8 / \text{bandwidth} \tag{1}$$

At step 110 the CRC error rate is derived as a function of the number of CRC errors per frame of dam transmitted; likewise at step 112 the alignment error rate is obtained as a function of the number of alignment errors per frame of data transmitted. At step 114 the frame utilization (that is the proportion of potential frame capacity actually used) is calculated from the actual frame count during the unit time interval and the maximum possible frame count for the type of network technology used in the segment under consideration, in accordance with the relationship:

$$\text{frame utilization} = \text{frame count/segment maximum} \tag{2}$$

These calculated parameters, together with the directly measured multicast and broadcast message rates, provide, in this example, a total of six parameters for use in subsequent stages of the procedure.

Figure 2B:
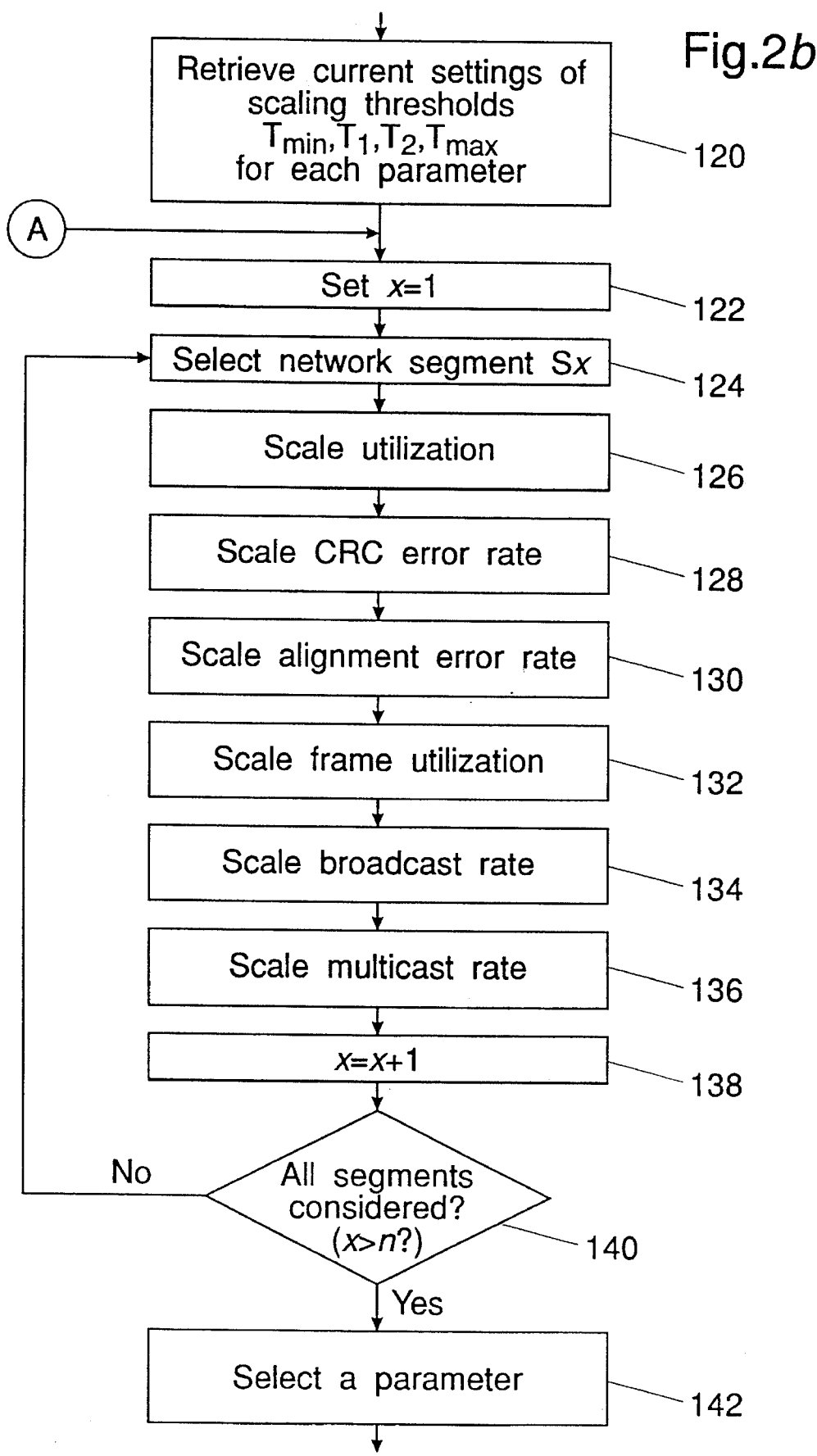

The counter x is incremented by one at step 116, and its value compared with the value of n at decision step 118. If x is not greater than n, the calculations in steps 108 to 114 need to be repeated for one or more other network segments S. Accordingly the procedure returns from the decision step 118 to step 106 to identify the next segment and perform those calculations. If x is greater than n, these calculations have been completed for all network segments and the procedure continues to the next step 120 (FIG. 2b).

The values of four threshold settings $T_{min}$, $T_1$, $T_2$ and $T_{max}$ (defined as explained below) are retrieved at step 120 for each of the six parameters (utilization, CRC error rate, alignment error rate, frame utilization, broadcast rate and multicast rate). The counter x is then initialized to a value of unity again at step 122 and used at step 124 to identify the segment to be considered in the following group of steps 126 to 136.

At step 126 the utilization value for the segment currently under consideration is scaled to have a value between 0 and 3, in accordance with a piecewise linear scaling function defined by the thresholds $T_{min}$, $T_1$, $T_2$ and $T_{max}$ for utilization. The general form of this scaling function is illustrated at 300 in FIG. 4. Thus, any value for utilization below $T_{min}$ is transformed to a scaled value of 0; any value between $T_{min}$ and $T_1$ is transformed to a scaled value between 0 and 1, in proportion to its value relative to $T_{min}$ and $T_1$; likewise, any value between $T_1$ and $T_2$ is transformed to a scaled value between 1 and 2, in proportion to its value relative to $T_1$ and $T_2$; any value between $T_2$ and $T_{max}$ is transformed to a scaled value between 2 and 3, in proportion to its value relative to $T_2$ and $T_{max}$; and any value above $T_{max}$ is transformed to a scaled value of 3.

Figure 3:
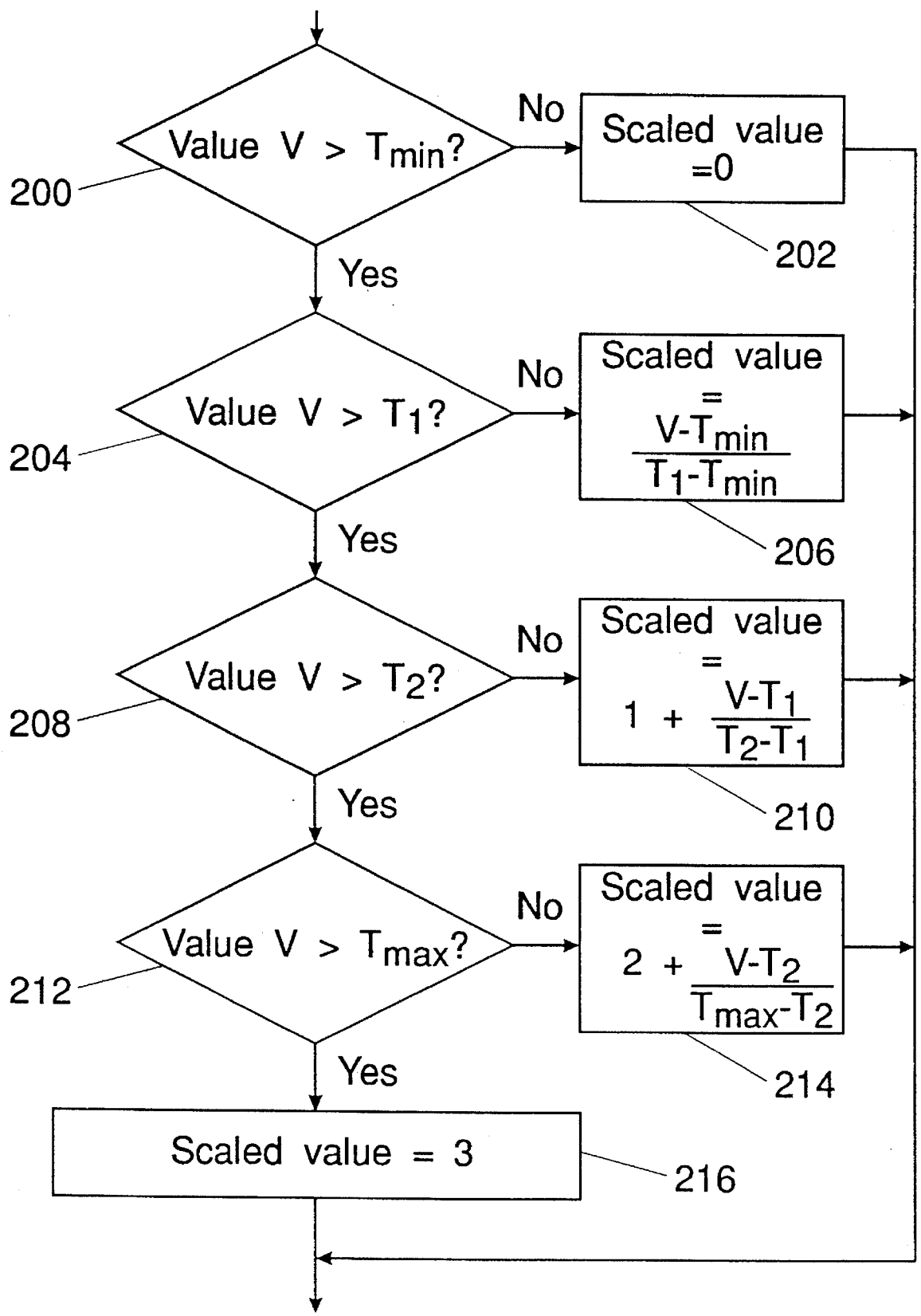
FIG. 3 is a flow chart showing a step in the chart of FIG. 2b in more detail.

FIG. 3 shows in more detail steps that are performed to implement this scaling. Thus at step 200 the value V of the utilization parameter is compared with the value of $T_{min}$; if V is not greater than $T_{min}$ the scaled value is set to 0, at step 202. Otherwise the value V is compared, at step 204, with the value of $T_1$; if V is no greater than $T_1$ the scaled value is determined at step 206 in accordance with the relationship $$(V-T_{min})/(T_1-T_{min}) \tag{3}$$

If V is greater than $T_1$, it is compared at step 208 with $T_2$, and, if less than or equal to $T_2$, the scaled value is calculated at step 210 from the relationship $$1+(V-T_1)/(T_2-T_1) \tag{4}$$

If necessary a final comparison is made at step 212 with $T_{max}$; if V is no greater then the scaled value is derived at step 214 in accordance with $$2+(V-T_2)/(T_{max}-T_2) \tag{5}$$

Otherwise the scaled value is set to 3 at step 216.

Referring again to FIG. 2b, scaling is applied in the same way at step 128 to the CRC error rate for the segment currently under consideration, in accordance with the values of the thresholds $T_{min}$, $T_1$, $T_2$ and $T_{max}$ applicable to CRC error rate. At steps 130 to 136 respectively, the values of alignment error rate, frame utilization, broadcast rate and multicast rate for the current segment are scaled in like manner, in accordance with the values of the thresholds $T_{min}$, $T_1$, $T_2$ and $T_{max}$ applicable to each of those parameters. Although the general nature of the scaling operation is similar for each parameter, it will be understood that the precise form of the scaling function as illustrated in FIG. 3 will vary from parameter to parameter, in dependence upon the values of the four thresholds for each parameter.

The counter x is incremented by one at step 138, and its value compared with the value of n at decision step 140. If x is not greater than n, the scaling operations in steps 126 to 136 need to be repeated for one or more other network segments S. Accordingly the procedure returns from the decision step 140 to step 124 to identify the next segment and perform those operations. If x is greater than n, these operations have been completed for all network segments and the procedure continues to the next step 142.

At step 142 one of the parameters (for example, utilization) is selected, and then at step 144 (FIG. 2c) all the scaled values of that parameter for the various segments S1 to Sn are sorted by value, but in such a manner that the identity of each value in terms of the network segment to which it relates is preserved. A test is performed at decision step 146 to establish whether this sorting procedure has been carried out for all of the six parameters; if not the procedure selects the next parameter at step 148 and then returns to step 146 to sort the scaled values of that newly selected parameter.

When sorting has been completed for all parameters, the procedure advances to step 150, where one of the parameters is again selected. At step 152 the maximum scaled value for the selected parameter is chosen, and its identity is tested at decision step 154 to establish whether the selected parameter for the network segment to which the chosen value relates has been previously denoted by the user (as explained below) to be 'masked', that is excluded from normal display of network status. Such masking may be desirable in circumstances where a known condition exists in the network and the user wishes temporarily to suppress indication of this condition to allow any other, possibly lesser but nonetheless significant conditions to become evident. The user's choices in this respect can be stored, for example, in a look-up table indexed by parameter and segment.

If the chosen maximum scaled value does relate to a segment for which the selected parameter is currently masked, then the next highest scaled value of the selected parameter is chosen at step 156, and the test at step 154 is repeated. This cycle continues until the highest unmasked value has been chosen.

Figure 5:
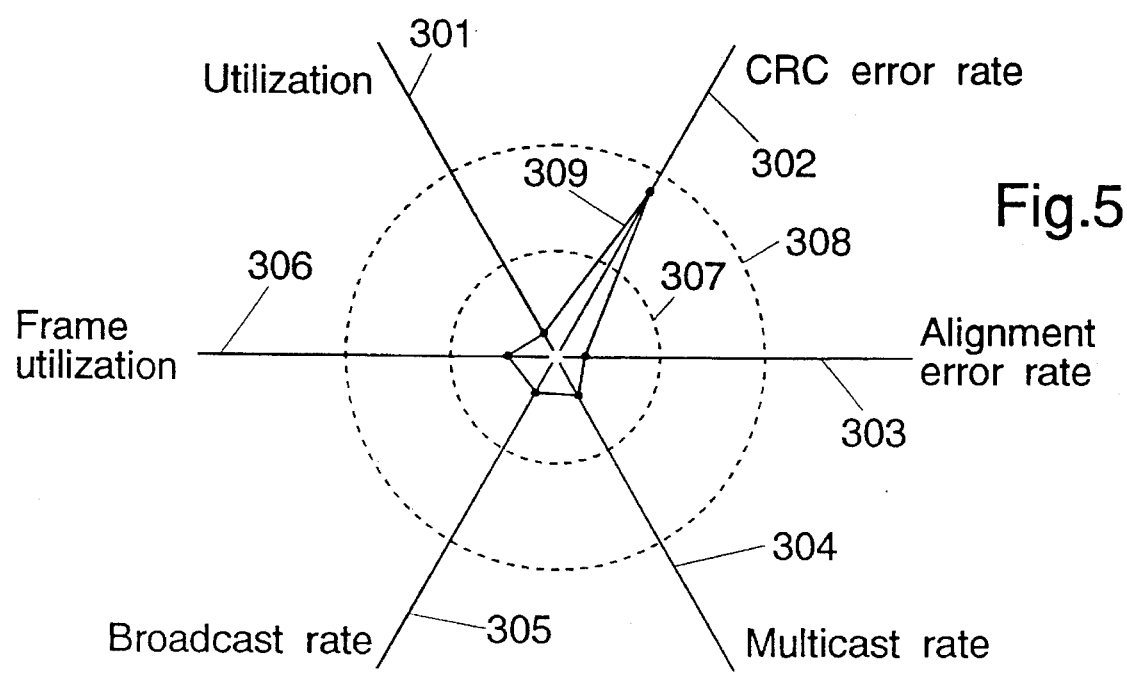
FIG. 5 is an illustration of a spider diagram.

The procedure then continues to step 158, at which the chosen scaled value (between 0 and 3) is plotted on an axis of a multiple-axis spider diagram, displayed for example on a visual display unit. As illustrated in FIG. 5, the spider diagram has, in this example, six equi-angularly spaced axes 301 to 306, one for each of the six parameters (utilization, CRC error rate, alignment error rate, frame utilization, broadcast rate and multicast rate). The chosen scaled value is plotted on the respective axis for the current selected parameter, at a point along it representing its value on the scale of 0 (at the centre) to 3 (at the periphery). To improve clarity the zero point on each axis is spaced slightly outwards from the geometric centre of the diagram.

A test is performed at decision step 160 to establish whether this procedure for choosing and plotting the maximum unmasked value has been carried out for all of the six parameters; if not the procedure selects the next parameter at step 162 and then returns to step 152 to choose and plot the scaled value of that newly selected parameter.

After values have been plotted for all six parameters, the procedure continues to step 164, where plotting of the spider diagram is completed. This may involve, for example and as shown in FIG. 5, labelling of each axis 301 to 306 of the diagram to indicate the associated parameter, adding circles 307 and 308 with radii of 1 and 2 units respectively on the same scale as for the plotting of the parameter scaled values, and connecting the point plotted on each axis to the points on the adjacent lines with straight lines to produce a polygonal FIG. 309. If desired, the interior of this polygon 309 may be coloured in accordance with the plotted values; thus the colour may be green if all values are no greater than 1 (indicating for example that these values are acceptable), yellow if any value is between 1 and 2 (that is marginal), and red if any value is greater than 2 (severe condition needing attention).

In the particular example illustrated in FIG. 5 it is immediately evident that most of the parameters have values, which are relatively low (and therefore, depending on the chosen threshold settings, probably acceptable). However, there is at least one CRC error rate which is significantly higher relative to its thresholds than are the other parameters; in particular it exceeds threshold $T_1$, probably set at a level indicating a potential problem, and it is therefore likely to warrant further investigation.

At the following step 166 (FIG. 2d) the user is provided with three choices: take no action; alter the scaling threshold settings $T_{min}$, $T_1$, $T_2$ and $T_{max}$ for one or more of the displayed parameters; or select a parameter for more detailed analysis. If the user takes no action, for example within a preset timeout period, the procedure automatically returns via entry point R to step 100 (FIG. 2a), to acquire a set of measurements or a new unit time interval and update the spider diagram accordingly, thereby maintaining an indication of the current overall network status. Previous sets of measurements are retained for possible detailed review, as described below, in the event that a problem is subsequently encountered.

If the user chooses to alter the threshold settings, the procedure moves to step 168, where the user is enabled to specify values for these threshold settings for each of the parameters (for example by entering values via a keyboard or by interaction with a graphical display using a pointing device). When the settings have been specified, the procedure returns via entry point A (FIG. 2b) to step 122, to derive new scaled values in accordance with the new threshold setting(s) and provide a correspondingly updated spider diagram.

Figure 6:
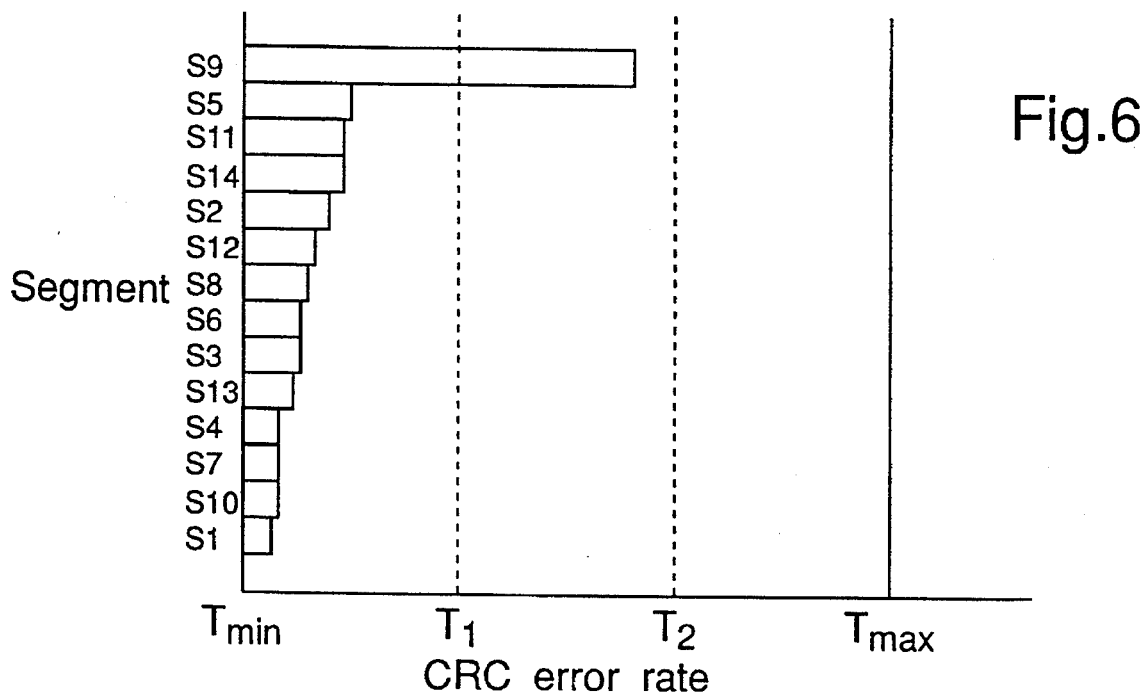
FIG. 6 is an illustration of a horizontal bar chart.

If the user selects one of the displayed parameters (for example by selecting, with a pointing device, the name of that parameter on the spider diagram), the procedure advances to step 170. Here a horizontal bar chart is provided, with the general form illustrated in FIG. 6, of the scaled values of the selected parameter for some or all of the network segments S. The values are conveniently displayed in descending order, with the largest value at the top of the chart. This facilitates identification by the user of segment(s) which may have a notably high value for that parameter, and facilitates comparison between segments. Thus, in the example shown in FIG. 6, it is clear that segment S9 has a much higher CRC error rate than the other segments of the network 10; furthermore, this error rate is above the threshold $T_1$ which has been established by the user.

The procedure now offers the user two further choices (step 172): to 'mask' the value of the current selected parameter for a chosen segment during generation of the spider diagram, or to select a particular segment for further analysis. If the user selects the mask option, the identity of each segment whose parameter value for the current parameter is to be masked is requested from the user and then stored at step 174, for example in a look-up table indexed by parameter and segment as described above. The procedure then returns via entry point B (FIG. 2c) to step 150, to select maximum scaled values for each parameter which are not masked and provide a correspondingly updated spider diagram.

Figure 7:
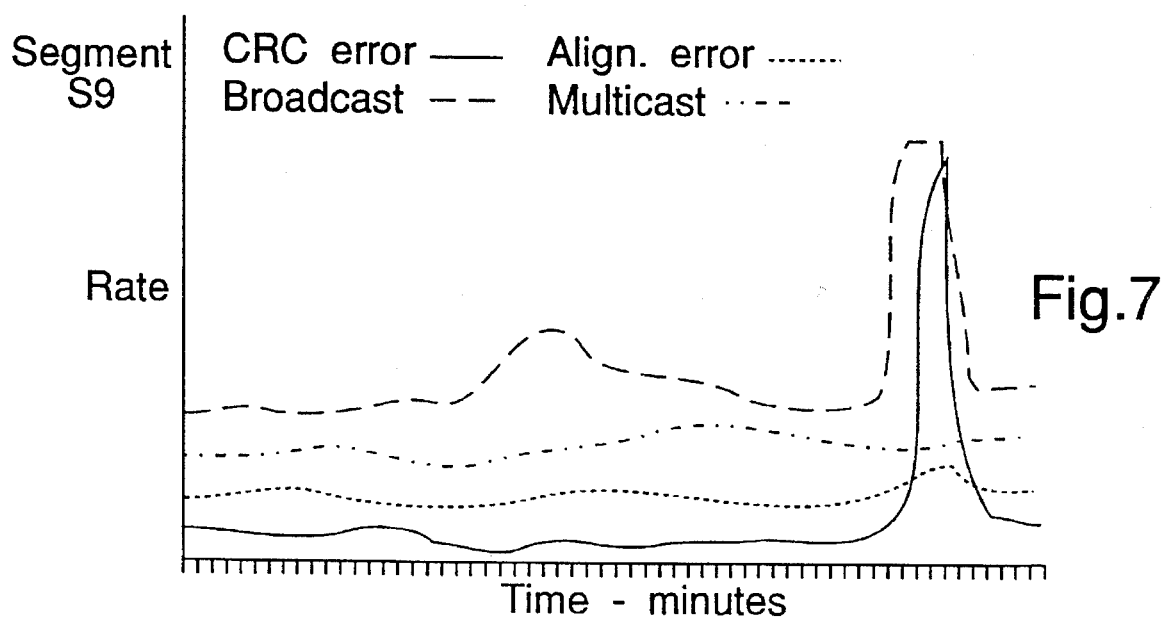
FIG. 7 is an illustration of a multi-parameter time series chart.

If the user selects a particular segment for further analysis, (for example by selecting with a pointing device the name of that segment on the bar chart), the procedure advances to step 176. At this step detailed data on the recent operational history of that segment are presented to the user, for example in the form of time series of values of various measured operating parameters relating to that segment. These parameters may include those originally measured or derived in order to prepare the spider diagram of FIG. 5, and may also include other measured or derived parameters which are typically recorded on a continuing basis for network management purposes, as described for example in European patent application No. 0 477 448. Thus, as indicated at step 178, the user may obtain:

a display of utilization, in terms of the 'top talkers' (the pairs of stations exchanging the most bytes of data) on the segment on a minute-by-minute basis;

a display of frame utilization, in terms of the 'top talkers' exchanging the most frames of data on the segment on a minute-by-minute basis;

a display of CRC error rate, alignment error rate, broadcast rate and multicast rate on the segment on a minute-by-minute basis (with the general form shown in FIG. 7).

Figure 2D:
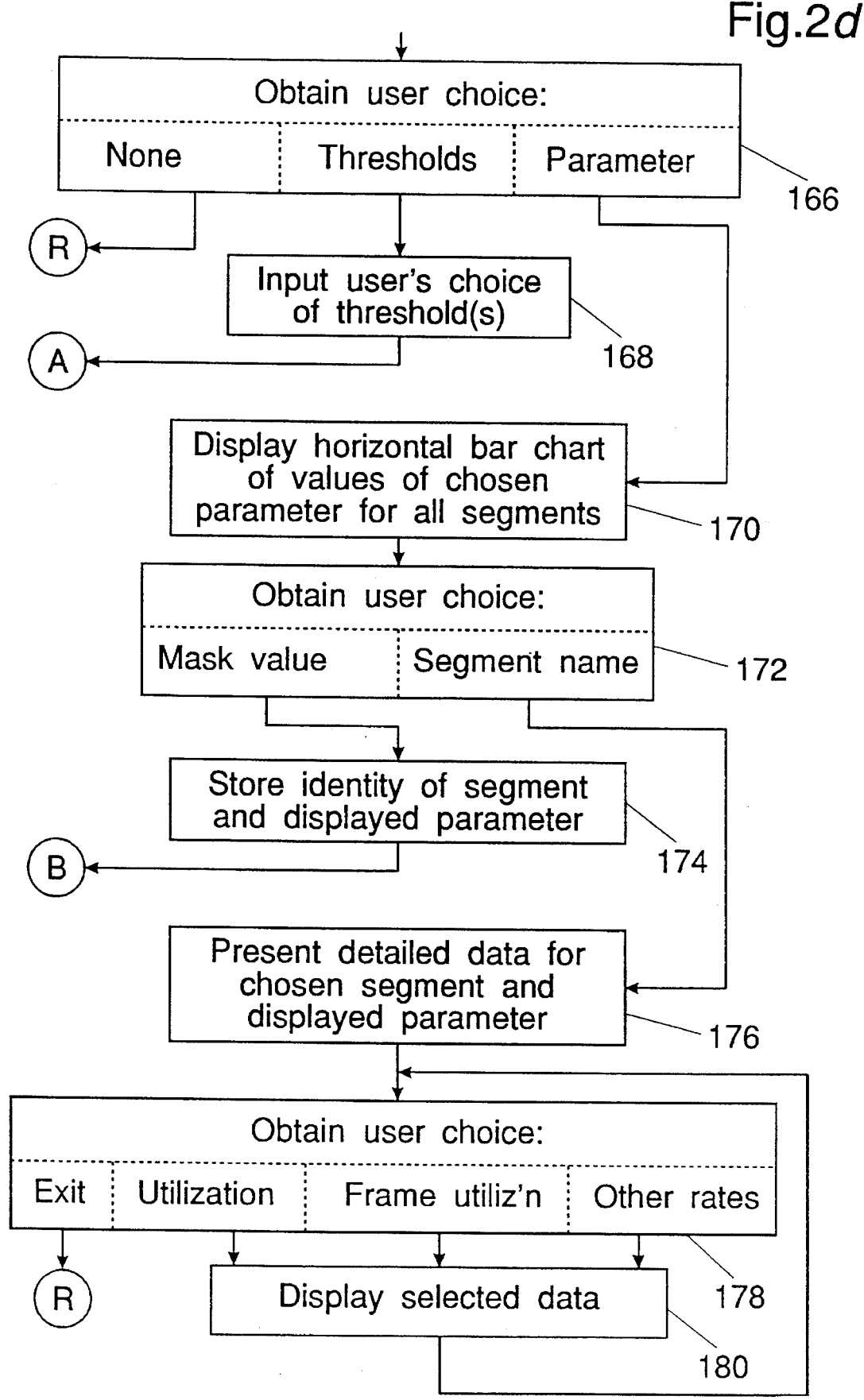

Whichever display is selected at step 178 is then provided at step 180, after which the procedure returns to step 178 to select other displays as required. As shown in FIG. 2d, the user may also exit these display options when desired, whereupon the procedure returns via entry point R to step 100 to acquire a new set of measurements and update the spider diagram.

Thus the procedure shown and described above alerts the user in an effective manner to potential problems affecting operation of the network 10, and enables the user to isolate quickly and effectively, from amongst the enormous number of parameter measurements available, those few measurements which will facilitate identification and rectification of the problem. In the example shown in FIG. 7, it is clear that the CRC error rate rises significantly at the same time as the broadcast rate, suggesting a correlation between these two events.

Although the embodiment illustrated in FIGS. 2 and 3 has been described in terms of a single-process procedural model for the sake of simplicity and clarity, it will be understood that the invention may also be implemented using multi-process event-driven techniques. Thus, for example, the process of acquiring measurements (step 100) may be arranged to continue concurrently with steps permitting the user to choose new thresholds or values to be masked (steps 168 and 174), the effects of such choices then being applied to whichever set of measurements are next used in updating the spider diagram.

The above description relates in particular to a network in the form of a LAN, and therefore having domains in the form of segments. However, the invention may be applied to other kinds of networks, such as SS7 signalling networks, and to other kinds of systems. In the case of an SS7 network, a domain may comprise, for example, a pair of signalling transfer points (STPs) and/or the signalling points (SPs) connected to a pair of STPs, or the signalling control points (SCPs) in a particular operator's network. Measurements may be made at step 100 of FIG. 2a of, for example, the following parameters for each domain:

for each sender/receiver pair, the number of Initial Address Messages (IAMs);

for each sender/receiver pair, the number of call releases for each type of failure cause indicator;

the number of octets (bytes) of each different type on a link.

For each domain in turn these measurements are then modified and combined, if necessary, and the results scaled, in a manner analagous to that described with reference to steps 104 to 140 of FIGS. 2a and 2b. The scaled values of one parameter are sorted and an extreme value selected and plotted, as in steps 142 to 164, and these steps are repeated for each of the remaining parameters.

In the case of an SS7 network it may be desirable to provide multiple spider diagrams simultaneously, each diagram being constructed as described above and displaying a different, respective combination of selected parameter values. Thus, for example, one spider diagram may display call-related measurements (e.g. call setup attempts at a particular point code) and another may display loads on the signalling links and on various types of signalling points in a domain.

Figure 4:
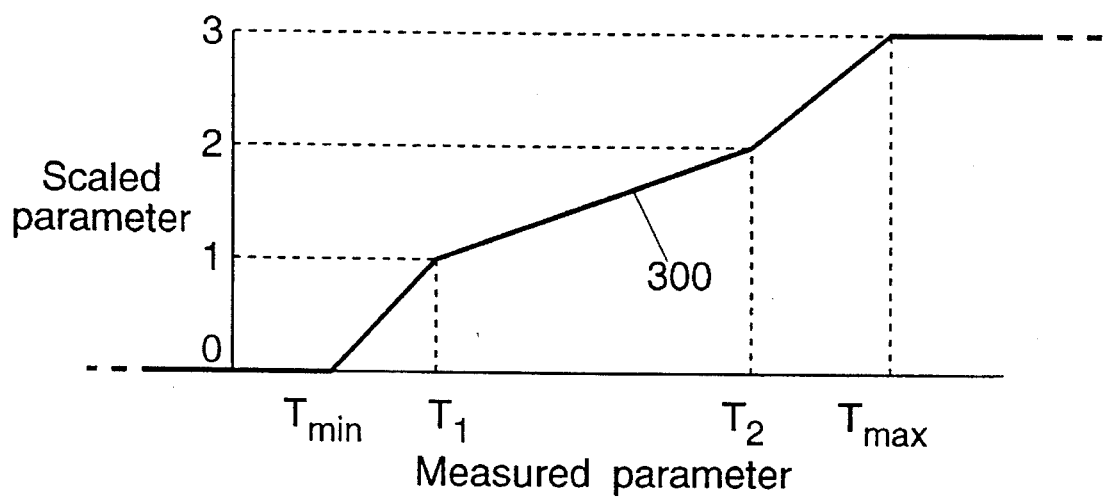
FIG. 4 is a graph illustrating a scaling function used in the method and implemented by the procedure shown in FIG. 3.

It may also be useful to select for display an extreme value of each parameter based not only on a set of thresholds which the parameter may rise above, as shown in FIG. 4, but also on additional thresholds which the parameter may fall below. Thus, for example, a parameter such as STP load may have a normal range of values within which it is expected to lie, so that values either side of this range justify being brought to the attention of a user. Accordingly thresholds in addition to $T_{min}$, $T_1$, $T_2$ and $T_{max}$ are defined, and the procedure in FIG. 3 is extended to include tests for the value V being less than any of these additional thresholds. If any such test is satisfied by a value of the parameter for a particular domain, that parameter value is selected for inclusion in the spider chart.

I claim:

1. A method of monitoring and displaying measurements of each of multiple different parameters related to an operational status of a system, comprising the computer implemented steps of:

acquiring multiple measurements of each of said parameters by monitoring the operational status of the system;

for each parameter, applying a scaling function to each measurement of that parameter to derive a scaled value thereof as a function of predetermined threshold values for that parameter, said scaled values being within a predetermined range common to all said parameters;

for each parameter, selecting a maximum one of said scaled values;

creating a graphical display including plural axes, each axis manifesting a scale which is associated with a parameter being measured, each axis identified as to a respective parameter being measured, said display further indicating at least one threshold value for each axis;

indicating on said display for each said measured parameter, said selected maximum one of said scaled values corresponding thereto on a corresponding axis and thereby indicating if any said selected maximum one of said scaled values exceeds said threshold indicated on said axis; and altering a graphical component of the display to indicate that a threshold has been exceeded by at least one said maximum one of said scaled values.

2. A method according to claim 1, wherein said axes extend radially from a common point.

3. A method according to claim 1, wherein said parameters comprise CRC error rate and alignment error rate.

4. A method according to claim 1, wherein said parameters comprise network utilization and frame utilization.

5. A method according to claim 1, wherein said parameters comprise broadcast rate and multicast rate.

6. A method according to claim 1, wherein said system comprises a multiple domain data communication network, respective ones of said multiple measurements of each parameter being acquired for respective domains of said network.

7. A method according to claim 6, wherein said domains comprise segments of a local area computer communications network.

8. A method according to claim 6, wherein said parameters comprise call-related measurements in a telecommunications signalling network.

9. A method according to claim 6, wherein said parameters comprise loads on at least some of signalling links and signalling points in a telecommunications signalling network.

10. A method according to claim 9, wherein call-related measurements are plotted on a first multiplicity of axes, and loads on said signalling links and signalling points are contemporaneously plotted on a second multiplicity of axes.

11. A method according to claim 1, wherein said scaling function is piecewise linear between said threshold values.

12. A method according to claim 1, wherein said scaling function has an upper threshold value, a lower threshold value and at least one intermediate threshold value.

13. A method according to claim 12, wherein said scaling function has four threshold values.

14. A method according to claim 1, including the step of excluding at least one measurement of a parameter from said selection of an extreme value of that parameter, in response to operator identification of said measurement.

15. A method according to claim 1, wherein said threshold values are adjustable under operator control.

16. A method according to claim 1, including the step of providing a display of respective values of a selected one of said parameters for a plurality of respective sections of said system in response to operator selection of that parameter.

17. A method according to claim 16, including the step of providing a display of multiple measurements of a parameter for a section of said system in response to operator selection of said section.

18. A method according to claim 1, including the step of connecting each value plotted on a respective said axis to its neighbouring plotted values to define a polygonal figure.

19. Computer apparatus for monitoring and displaying measurements of each of multiple different parameters related to an operational status of a system, comprising:

means coupled to said system for receiving measurements of each of said parameters;

means for applying, for each parameter, a scaling function to each measurement of that parameter to derive a scaled value thereof as a function of predetermined threshold values for that parameter, said scaled values being within a predetermined range common to all said parameters;

means for selecting, for each parameter, a maximum one of said scaled values;

means for creating a graphical display including plural axes, each axis manifesting a scale which is associated with a parameter being measured, each axis identified as to a respective parameter being measured, said display further indicating at least one threshold value for each axis; means for indicating on said display for each said measured parameter, said selected maximum one of said scaled values corresponding thereto on a corresponding, axis and thereby indicating if any said selected maximum one of said scaled values exceeds said threshold indicated on said axis; and means responsive to any said selected maximum one of said scaled values exceeding a threshold indicated on a corresponding axis for altering a graphical component of the graphical display to indicate that at least one said scaled values exceeds a threshold on a corresponding axis.

20. Apparatus according to claim 19, wherein said axes extend radially from a common point.

* * * * *